Feb. 7, 1967    F. L. YUAN    3,303,451
BEAM-TYPE TRANSDUCERS
Filed Dec. 16, 1964

INVENTOR.
FRANK L. YUAN
BY
Dike, Thompson, Bronstein & Mrose
ATTORNEYS

United States Patent Office 3,303,451
Patented Feb. 7, 1967

3,303,451
BEAM-TYPE TRANSDUCERS
Frank L. Yuan, West Newton, Mass., assignor to BLH Electronics, Inc., Waltham, Mass., a corporation of Delaware
Filed Dec. 16, 1964, Ser. No. 418,636
3 Claims. (Cl. 338—4)

The present invention relates to improvements in electrical strain gage transducers, and, in one particular aspect, to unique miniaturized diaphragm-actuated beam-type transducers wherein stress-responsive cantilever beam elements which may be fabricated at relatively low cost promote high-precision measurements by associated electrical resistance strain gages.

It has long been well known to measure elastic strains resulting from loading-induced stresses of elements such as beams, columns, diaphragms, and the like, using electrical strain gages for the accurate translations of the exhibited strains into convenient related variations in electrical impedances. Wire, foil and semiconductor type gages find widespread application in such devices, and well lend themselves to manufacture in highly miniaturized forms suitable for installation upon small surface areas of sensing elements. For many purposes it is important that the stress-responsive element be of very minute proportions, but that it nevertheless be fabricated, handled and installed economically and without undue risk of damage. In one typical usage, such an element must respond very precisely and sensitively to the deflections of a very small diaphragm, and must itself be of correspondingly diminutive proportions. According to the present teachings, a unique double-cantilever beam transducer, which is readily produced in minute sizes through use of conventional machining practices, satisfies such needs most advantageously and, at the same time, avoids disturbing effects of the usual moment arm variations which commonly lead to measurement errors.

It is one of the objects of the present invention, therefore, to provide novel and improved beam-type transducers which uniquely lend themselves to low-cost manufacture and which operate to circumvent undesirable effects of moment arm variations and to extend the range of linear deflections and bending stresses to which the transducer outputs are proportional.

Another object is to provide high-precision double-cantilever load transducers having unusual mechanical niceties which promote economical fabrication and miniaturization.

Further, it is an object to provide improved pressure transducers wherein small pressure-responsive diaphragms cooperate with minute double-cantilever transducers to develop precise measurements of fluid pressure without involving appreciable secondary distortions of the diaphragms.

A yet further object is to provide miniature load transducers wherein sensitive double-cantilever beam elements are formed by simple machining, including slotting, of small disk-shaped members.

By way of a summary account of practice of this invention in one of its aspects, a peripherally-restrained metal diaphragm which responds to differential pressures is centrally fixed in actuating relationship to the central axially-extending stem of a transducer having an outline which is symmetrical (specifically, circular) in relation to a center. The latter transducer includes a relatively stiff outer rim, which is also restrained in the manner of the diaphragm, and a somewhat thinner circular plate portion integral with the rim and central axially-extending stem. A pair of closely-spaced parallel slots, one on each side of the stem, are cut through the circular plate portion, from one side of the rim to the other, and the short stem itself is deeply slotted by a cut extending from one free end to a position on the other side of the plate portion, the stem slotting being in direction transverse to the two parallel slots. The unslotted end of the stem is acted upon by the diaphragm, with its movements causing resulting beam-type deflections of those narrow portions of the transducer which lie between the two parallel slots thereof. These beam-type deflections are accommodated by flexures occurring in the slotted portion of the stem and in certain flexure portions of the beam structures, such that a substantially constant moment arm is always preserved between the axis of the stem, along which the loading occurs, and the transducer rim, where the flexible cantilever beam portions are restrained. Strain gages applied to upper and lower surfaces of the cantilever beam portions yield electrical measurement data characterizing the pressure differentials experienced by the diaphragm.

Although the features of this invention which are considered to be novel are set forth in the appended claims, further details as to preferred practices and as to the further objects and advantages thereof may be most readily comprehended through reference to the following description taken in connection with the accompanying drawings, wherein:

Figure 4:
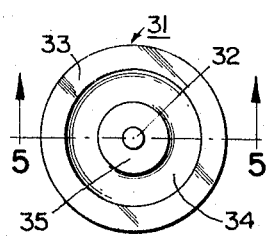
Figure 5:
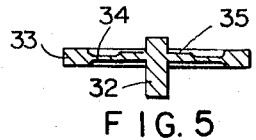
Figures 6, 9:
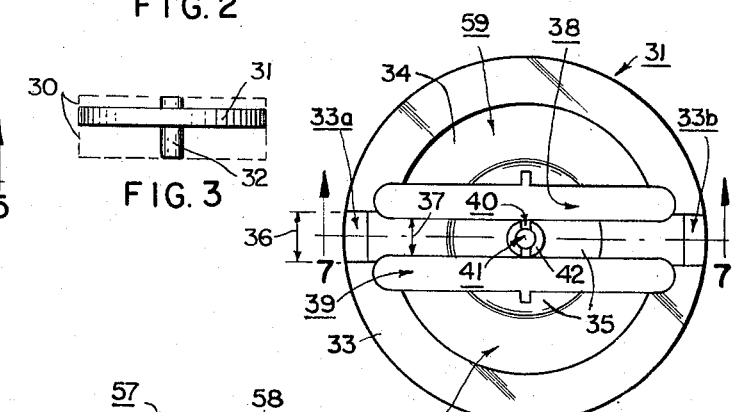
Figure 8:
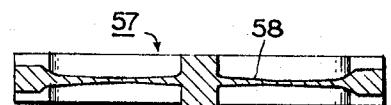
Figure 7:
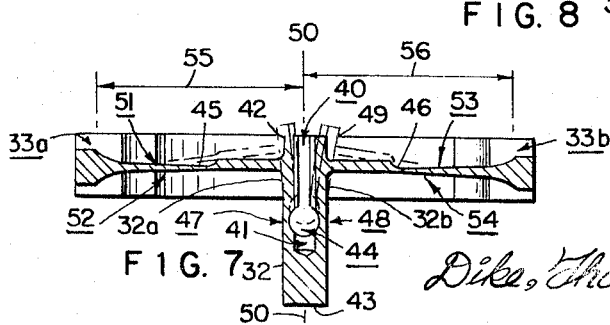

FIGURE 3 provides a side view of a disk having a central stem, which is to be fabricated into a cantilever-beam type transducer, together with an outline of the larger element from which it is formed;

FIGURE 4 is a plan view of the structure of FIGURE 3 at a subsequent stage of manufacture when a thin annular section has been developed;

FIGURE 5 is a cross-section of the structure of FIGURE 4 taken along section line 5—5 of FIGURE 4;

FIGURE 6 represents an enlarged plan view of the structure of FIGURES 4 and 5 following subsequent machining, including slotting of the stem and disk;

FIGURE 7 provides a cross-section of the structure of FIGURE 6 taken along section line 7—7 thereof;

FIGURE 8 is a transverse cross-section, like that of FIGURE 7, of an alternative configuration of cantilever-beam transducer, and FIGURE 9 illustrates a deflected fragment of the structure of FIGURE 7.

Figure 1:
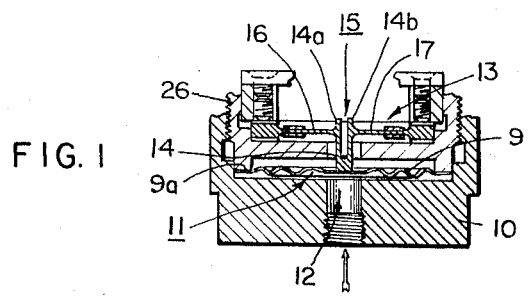
FIGURE 1 is a cross-sectioned side view of an improved transducer assembly including a diaphragm actuating a cantilever-beam stress-responsive structure.
Figure 2:
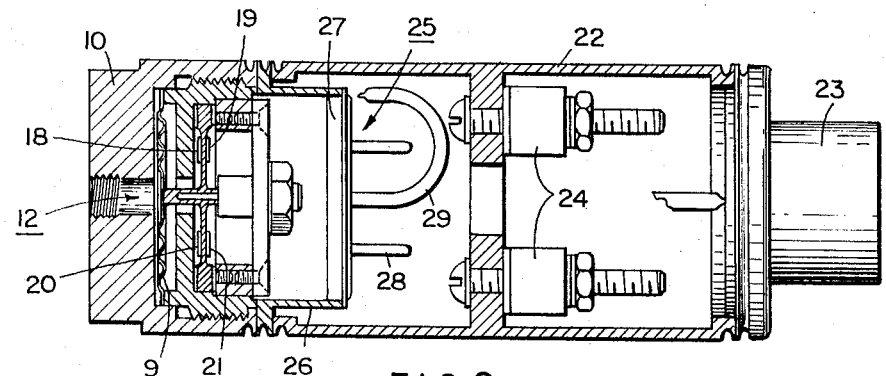
FIGURE 2 illustrates, in cross-section, a pressure gage device incorporating the transducer assembly of FIGURE 1.

The assembly depicted in FIGURE 1 is one which responds to differential pressures witnessed by a generally circular flexible diaphragm 9; for this purpose the outer periphery 9a of the diaphragm is fixedly held and sealed in relation to a base member 10 in which a cavity 11 between that member and one side of the diaphragm is exposed to fluid pressures communicated to it from a site of measurement interest via the port 12. Resulting deflections and/or forces of the center of the diaphragm are communicated to a cantilever-beam type metal transducer unit 13 by way of a small cylindrical stem 14 which at one end is in fixed force-transmitting relation to the diaphragm center and which, at the opposite end, exhibits a deep slot 15 effectively dividing it into two upstanding laterally deflectable arms 14a and 14b. These arms are integral with the movable ends of flexible cantilever beam elements 16 and 17, respectively, which are normally substantially perpendicular to these arms and which, at their opposite ends, are held in fixed relationship with the base member 10. Electrical strain gages 18-21 (FIGURE 2) are applied to the flat opposite sides of the beam elements, where they will respond to the compression and tension effects exhibited at those sites. Associated electrical measurement equipment of conventional form (not illustrated) translates the strain gage resistance variations into related output signals which may actuate an instrument such as a recorder, galvanometer, or the like. The complete transducer device (FIGURE 2) involves a casing 22 attached to the base member, an electrical connector 23, associated resistances 24, and a sealed internal sub-assembly 25 wtihin which the diaphragm-beam unit is disposed. The latter sub-assembly includes a housing framework 26 welded to the base member 10 and to a header 27 through which extend sealed terminals 28 and a sealing tube 29 which serves to evacuate unwanted gases and/or to admit a fill of inert gas at a predetermined pressure level. Diaphragm 9 is welded to one end of framework 26.

Double cantilever-beam transducer structures, such as 13, are each advantageously fabricated from a single piece of metal stock capable of producing the desired elastic deformation characteristics under loading. As is exemplified by the dashed linework 30 in FIGURE 3, the stock may at an early stage of production be in a short cylindrical form, and may be conveniently machined to the form of a substantially flat disk 31 having an integral hub-like central cylindrical stem 32. In FIGURES 4 and 5, the disk is shown to be machined such that it exhibits a thick annular peripheral ring portion 33 merging with a relatively thin intermediate annular portion 34, the latter in turn being merged with a somewhat thicker central annular hub portion 35 extending radially outwardly from the stem 32. The illustrations in FIGURES 6 and 7 disclose that the rim is somewhat reduced in thickness, by machining of both sides, at diametrically opposite sites 33a and 33b, the width 36 of the rim reduction being somewhat greater than the intended width 37 of the completed beam elements. Two parallel slots 38 and 39, extending just less than the full distance across the disk, are cut through the disk laterally of the stem 32. Further, the stem is slotted part way along its length, as by the cutting action of a rotary saw blade, in direction transverse to the two parallel slots. The stem slot 40, corresponding to slot 15 in FIGURE 1, is preferably the result of such cutting as well as the drilling of a central longitudinal hole 41 in the stem from the same end, 42. The opposite stem end, 43, which is to be welded or otherwise secured to the actuating diaphragm, remains unslotted and undrilled. Preferably, however, a further drilled opening, 44, is also formed, below the level of the two resulting cantilever-beam members 45 and 46, and in direction parallel with the direction of stem slot 40, such that the wall thickness of the stem is further reduced at sites 47 and 48 (FIGURE 7). Dashed linework 49 in FIGURE 7 characterizes the type of deflections which occur in the two beam members 45 and 46 as the bifurcated stem is thrust upwardly along the longitudinal stem axis 50—50. Stem arms 32a and 32b (corresponding to the stem arms 14a and 14b in FIGURE 1) are relatively stiff but are laterally deflected as the result of bending at sites 47 and 48, thereby enabling the consequent important bending of the beam arms which develops the strains measured at strain gage sites 51–54. The moment arms 55 and 56 for the cantilever-beam members 45 and 46 remain constant at all times during their deflections, thereby circumventing a serious shortcoming and source of measurement errors commonly involved in cantilever beam transducers.

In FIGURE 9, the fragment of the transducer unit appearing in FIGURE 7 is shown in a deflected condition. Stem arm portion 32b, which is relatively stiff, is integrally joined with a relatively stiff portion 35b which is formed from the annular hub portion 35 (FIGURES 4 and 6), producing a stiff link having an L-shaped configuration in cross section. Preferably, the effective lengths, 57 and 58, respectively, of these two portions of the link are substantially the same. Moreover the flexure site 48 on the stem is matched by a reduced-thickness flexure site 59 between beam member 46 and link portion 35b, with the sectional moduli of these two integral flexures being substantially the same so that the flexing effects are distributed substantially equally between these flexures. When the two portions of the L-shaped link are of the same lengths, 57 and 58, and when the two flexure sites share the flexing equally as the L-shaped link "rotates" while the stem is being deflected, the resulting cantilever-beam member stresses are desirably proportional to the stem deflections. The relationships are the same for the companion link, and the stem witnesses no appreciable lateral displacements upon being deflected along axis 50—50. Consequently, the attached diaphragm experiences no appreciable secondary deformations.

The cross-section of a partly-formed (i.e. stem not yet slotted) transducer unit 57 which appears in FIGURE 8 typifies a permissible variation in configuration of the thin intermediate annular portion 58 from which the cantilever beam members are to be developed. It will be evident that the beam member cross-sections may be designed to meet the needs of different applications. In each instance the resulting transducer unit is readily handled and installed, and retains a desirable structural integrity and predetermined symmetry of the two cantilever-beam members, because of the presence of the stiff annular rim with which the beam members are integral. Typically, such transducer elements may have an outer diameter merely of about $11/16$ inch (the drawings being in enlargement). Inactive segments 59 and 60 (FIGURE 6) afford convenient sites for securing electrical wiring with the leads from the extremely small strain gages on the beam members. Stiff rim portions for the transducer units are preferably, though not necessarily, generally circular, and may be rectangular, for example. Although shown as being of relatively low height, the rim portions may assume other forms, including the form of a cylinder or the like.

It should be understood that the embodiments and practices described and portrayed herein have been presented by way of disclosure, rather than limitation, and that various modifications, substitutions and combinations may be effected without departure from the spirit and scope of this invention in its broader aspects.

What I claim as new and desire to secure by Letters Patent of the United States is:

1. Strain-responsive apparatus comprising a transducer element including a substantially stiff annular rim, substantially coplanar flexible cantilever beam members each integral with said rim at one end and of thickness less than that of said rim and each extending inwardly of the rim toward the center thereof from a portion of said rim substantially diametrically opposite to that from which the other of said beams extends, an elongated substantially stiff stem disposed at the center of said rim on at least one side of said coplanar beam members movable in directions of its longitudinal axis and substantially normal to the plane of said rim, said stem having a pair of substantially parallel stiff bifurcated arm portions separated by a slot extending substantially transversely to said beam members, said arm portions being integral with different ones of said beam members and being flexibly integral with the remainder of said stem at discrete flexure sites on said one side of said beam members which are substantially the same distance from the junctions of said stiff arm portions with said beam members, said elongated stem having an opening therein wider than the slot which reduces the thickness of said arm portions at said sites and thereby accommodates deflections of said stiff arm portions laterally of said stem, electrical strain gage means affixed to surfaces of said beam members for developing electrical output signals responsive to bending thereof, and means for applying forces to said stem along said axis at a position further removed from said beam members than said flexure sites.

2. Strain-responsive apparatus as set forth in claim 1 wherein said stem is substantially cylindrical, and wherein said opening comprises a drilled cylindrical opening, of diameter greater than the width of said slot and less than the diameter of said stem, extending in direction parallel to said slot on said one side of said beam members.

3. Strain-responsive apparatus as set forth in claim 2 wherein said transducer element includes an annular portion of lesser thickness than said rim extending between said rim and said stem and interrupted by two parallel slots extending fully thereacross one on each side of said stem and between which said cantilever beam members are formed, wherein said annular portion is relatively thick and stiff near said stem and is relatively thin near said rim, whereby each of said beam members includes a relatively flexible portion near said rim and is integrally joined with a relatively stiff and inflexible portion near said stem, wherein said stiff arm portions of said stem and the relatively stiff and inflexible portions of said beam members near said stem are of substantially the same length, and wherein said relatively stiff and inflexible portions of said beam members are joined integrally with the relatively flexible portions of said beam members at relatively flexible junctures having substantially the same flexibility as that of said flexure sites of said stem, whereby the bending stresses in said beam members are proportional to deflections of said stem along said longitudinal axis.

References Cited by the Examiner

UNITED STATES PATENTS

| | | | |
|---|---|---|---|
| 2,377,212 | 5/1945 | Cottrell | 73—517 |
| 2,704,452 | 3/1955 | Federn | 73—88.5 |
| 2,918,816 | 12/1959 | Ormond | 73—88.5 X |
| 3,019,643 | 2/1962 | Curry | 73—88.5 X |
| 3,022,672 | 2/1962 | Dimeff et al. | |
| 3,075,160 | 1/1963 | Starr | 73—88.5 X |
| 3,168,718 | 2/1965 | Swartz et al. | 338—42 |
| 3,204,463 | 9/1965 | Taber. | |

FOREIGN PATENTS 522,411   4/1955   Italy.

RICHARD M. WOOD, *Primary Examiner.*

W. D. BROOKS, *Assistant Examiner.*